United States Patent
Thomas

(10) Patent No.: US 6,488,313 B1
(45) Date of Patent: Dec. 3, 2002

(54) FLEXIBLE CONNECTOR ASSEMBLY FOR EXHAUST SYSTEM

(75) Inventor: R. Winfield Thomas, West Lebanon, IN (US)

(73) Assignee: Tru-Flex Metal Hose Corp., West Lebanon, IN (US)

( * ) Notice: Subject to any disclaimer, the term of this patent is extended or adjusted under 35 U.S.C. 154(b) by 0 days.

(21) Appl. No.: 09/357,222

(22) Filed: Jul. 20, 1999

(51) Int. Cl.⁷ ............................................... F16L 27/10
(52) U.S. Cl. ........................... 285/49; 285/300; 285/236
(58) Field of Search ............................ 285/49, 300, 236

(56) References Cited

U.S. PATENT DOCUMENTS

| | | | | |
|---|---|---|---|---|
| 2,337,038 A | * | 12/1943 | Fentress | 285/300 |
| 3,492,030 A | * | 1/1970 | Harrison et al. | 285/300 |
| 4,659,117 A | * | 4/1987 | Holzhausen et al. | 285/49 |
| 5,167,430 A | * | 12/1992 | Bainbridge | 285/49 |
| 5,222,288 A | * | 6/1993 | Thomas | 29/514 |
| 5,318,329 A | * | 6/1994 | Suzuki et al. | 285/49 |
| 5,437,479 A | * | 8/1995 | Hartling et al. | 285/49 |
| 5,511,828 A | * | 4/1996 | Kurek et al. | 285/49 |
| 5,769,463 A | * | 6/1998 | Thomas | 285/49 |
| 5,806,899 A | * | 9/1998 | Norikawa et al. | 285/300 |
| 5,967,565 A | * | 10/1999 | Kim | 285/49 |
| 6,109,661 A | * | 8/2000 | Cwik et al. | 285/45 |
| 6,164,703 A | * | 12/2000 | Kim | 285/49 |

* cited by examiner

*Primary Examiner*—Teri Pham Luu
(74) *Attorney, Agent, or Firm*—Shook, Hardy & Bacon L.L.P.

(57) ABSTRACT

A flexible connector assembly is provided for an exhaust system. The exhaust system includes first and second rigid exhaust pipes. The flexible connector assembly includes a flexible metal hose section and a liner tube. The liner tube has a first, enlarged-diameter section and a second, reduced-diameter section. The liner tube first section is fixedly secured within the hose section. An annular clearance is formed between the liner tube second section and the hose section. The connector assembly effectively resists vibration and provides a relatively fluid-tight passage for exhaust gasses between the first and second exhaust pipes.

1 Claim, 4 Drawing Sheets

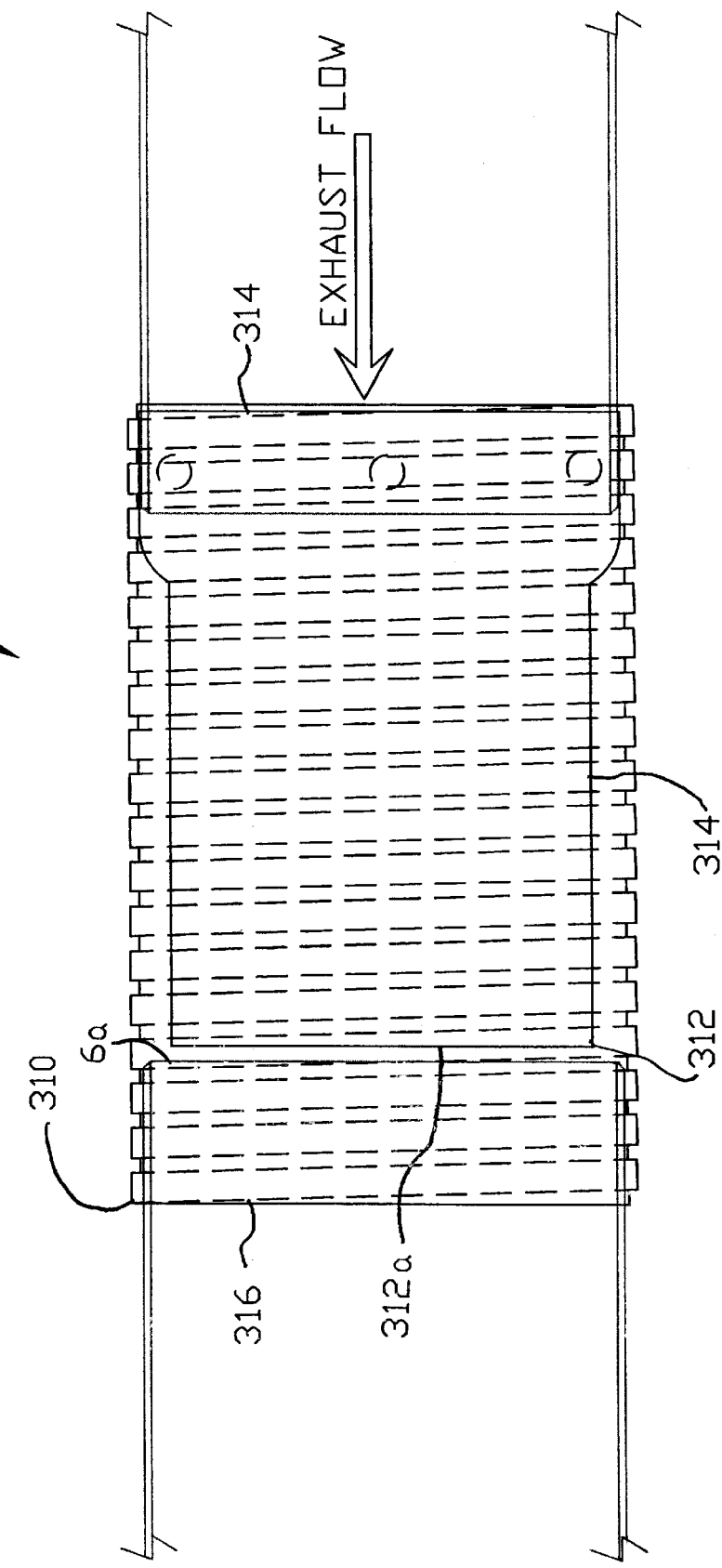

FLEXIBLE CONNECTOR ASSEMBLY FOR EXHAUST SYSTEM

BACKGROUND OF THE INVENTION

1. Field of the Invention

The present invention relates generally to exhaust systems, and in particular to a flexible connector assembly for exhaust pipes.

2. Description of the Prior Art

Exhaust systems commonly include exhaust pipes leading from exhaust manifolds to environmental control devices, such as catalytic converters, mufflers, etc. In vehicles, such as over-the-road trucks, the exhaust system components are subjected to relatively severe operating conditions, including thermal expansion-contraction cycles, vibration, and corrosion and oxidation due to precipitation, road salt, and other sources.

Flexible metal hose sections have previously been used in vehicle exhaust systems. They offer the advantages of resistance to heat and vibration. Moreover, they can be fabricated from various metals for corrosion resistance. However, a disadvantage of many prior art flexible hose sections relates to exhaust gas leakage. Accordingly, it is preferable to provide a liner within a flexible metal hose section. A liner can significantly reduce exhaust gas leakage. However, previous designs for lined flexible metal hose tended to have reduced flexibility.

The present invention addresses these disadvantages with previous flexible hose designs. Heretofore there has not been available a flexible connector assembly with the advantages and features of the present invention.

SUMMARY OF THE INVENTION

In the practice of the present invention, a flexible connector assembly is provided for an exhaust system. The exhaust system includes first and second rigid exhaust pipes. The flexible connector assembly generally includes a length of flexible metal hose and a liner tube located therein. The liner tube has a first, enlarged-diameter section which is secured to the flexible metal hose within a bore thereof. The liner tube also includes a second, reduced-diameter section. An annular clearance is provided between the flexible metal hose section and the liner tube.

OBJECTS OF THE INVENTION

The principle objects of the present invention include: providing a flexible connector assembly for an exhaust system; providing such a connector assembly which is adapted for connecting rigid exhaust pipes; providing such a connector assembly which includes a liner; providing such a connector assembly which includes a liner with a first, enlarged-diameter section and a second, reduced-diameter section; providing such a connector assembly which can be installed with readily-available tools and supplies; and providing such a connector assembly which is efficient in operation, capable of a long operating life and particularly well adapted for the proposed usage thereof.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 4 is a side elevational view of a third modified embodiment thereof.

DETAILED DESCRIPTION OF THE PREFERRED EMBODIMENTS

Figure 1:
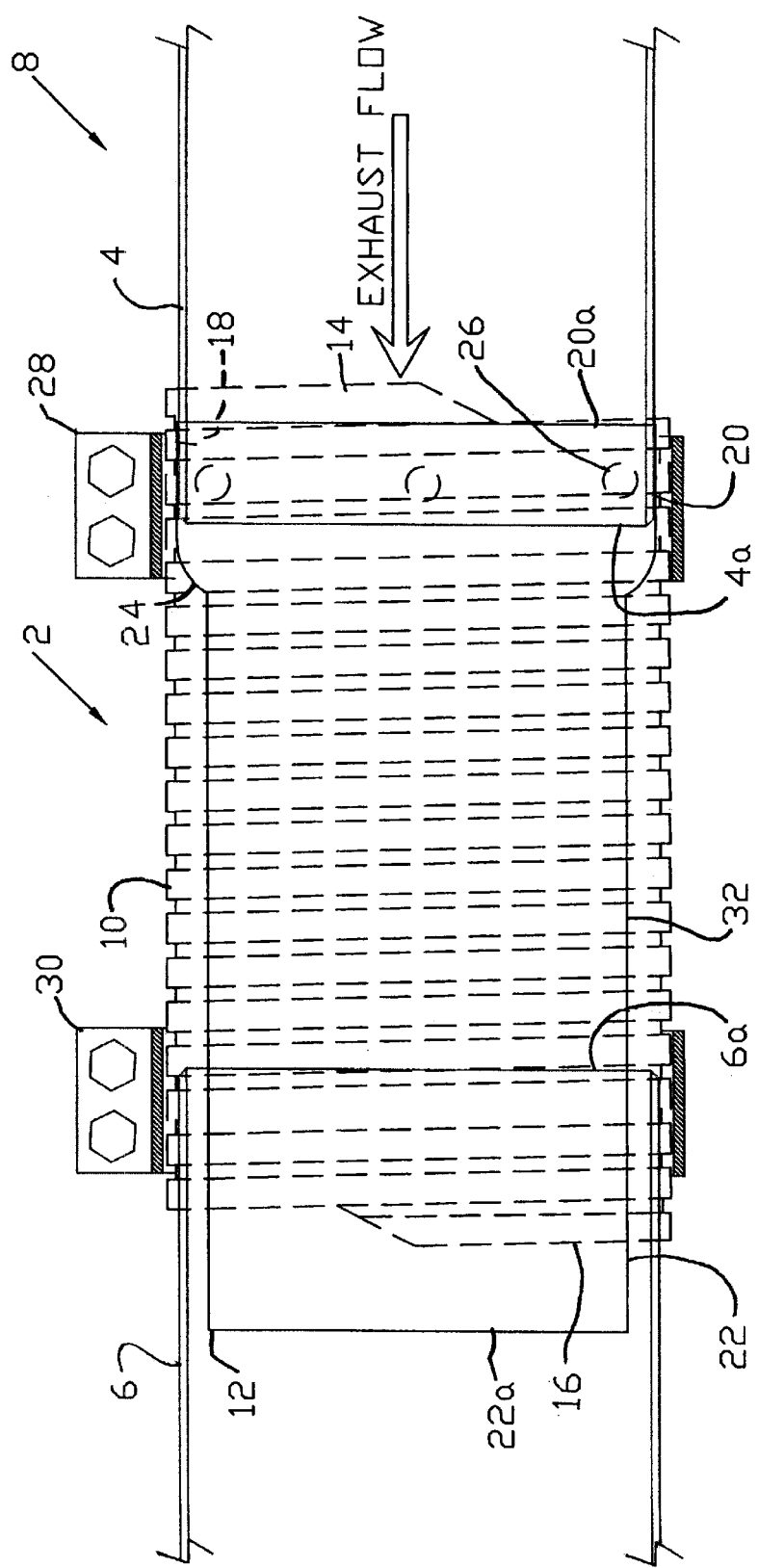
FIG. 1 is a side elevational view of a flexible connector assembly embodying the present invention shown in an exhaust system.

I. Introduction and Environment.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more details, the reference numeral 2 generally designates a flexible connector assembly embodying the present invention. The flexible connector assembly 2 connects first and second exhaust pipes 4, 6 in a vehicle exhaust system 8. The exhaust pipes 4, 6 have respective exhaust pipe ends 4a, 6a.

The connector assembly 2 generally comprises a length of flexible metal hose 10 and a liner tube 12.

II. Flexible Metal Hose Section 10

The flexible metal hose section 10 is spiral-wound with interlocking leading and trailing edges, as disclosed in Thomas U.S. Pat. No. 5,222,288, which is incorporated herein by reference. The hose 10 includes first and second ends 14, 16 and a hose bore 18 extending between and open at the ends 14, 16. Although a spiral-wound flexible metal hose 10 is shown and described, other flexible hose configurations, such as corrugated, could be employed with the present invention.

III. Liner Tube 12

The liner tube 12 includes a first, enlarged-diameter, upstream section 20 and a second, reduced-diameter, downstream section 22. The liner tube sections 20, 22 have respective ends 20a, 22a. The liner tube 12 includes a tapered transition section 24 located between the first and second sections 20, 22. The liner tube 12 is secured within the hose section bore 18 by a plurality of spot welds 26 located in annularly-spaced relation around the liner tube first section 20 and extending into the hose 10 in proximity to its first end 14. The liner tube first section 20 forms a relatively tight connection with the hose 10 whereby exhaust gas leakage therebetween is minimized. Moreover, other fastening means, such as circular weldments, adhesives, clamps, etc., can be used to secure the liner tube 12 within the hose bore 18. For example, first and second annular band clamps 28 can be provided for clamping the hose 10, the liner 12 and the first exhaust pipe 4 together. A second optional band clamp 30 secures the second exhaust pipe 6 adjacent to its end 6a within the hose section bore 18 adjacent to the hose section second end 16. As shown, the liner tube 12 is telescopically received within the second exhaust pipe 6 adjacent to its end 6a.

IV. First Modified Embodiment Connector Assembly 102

Figure 2:
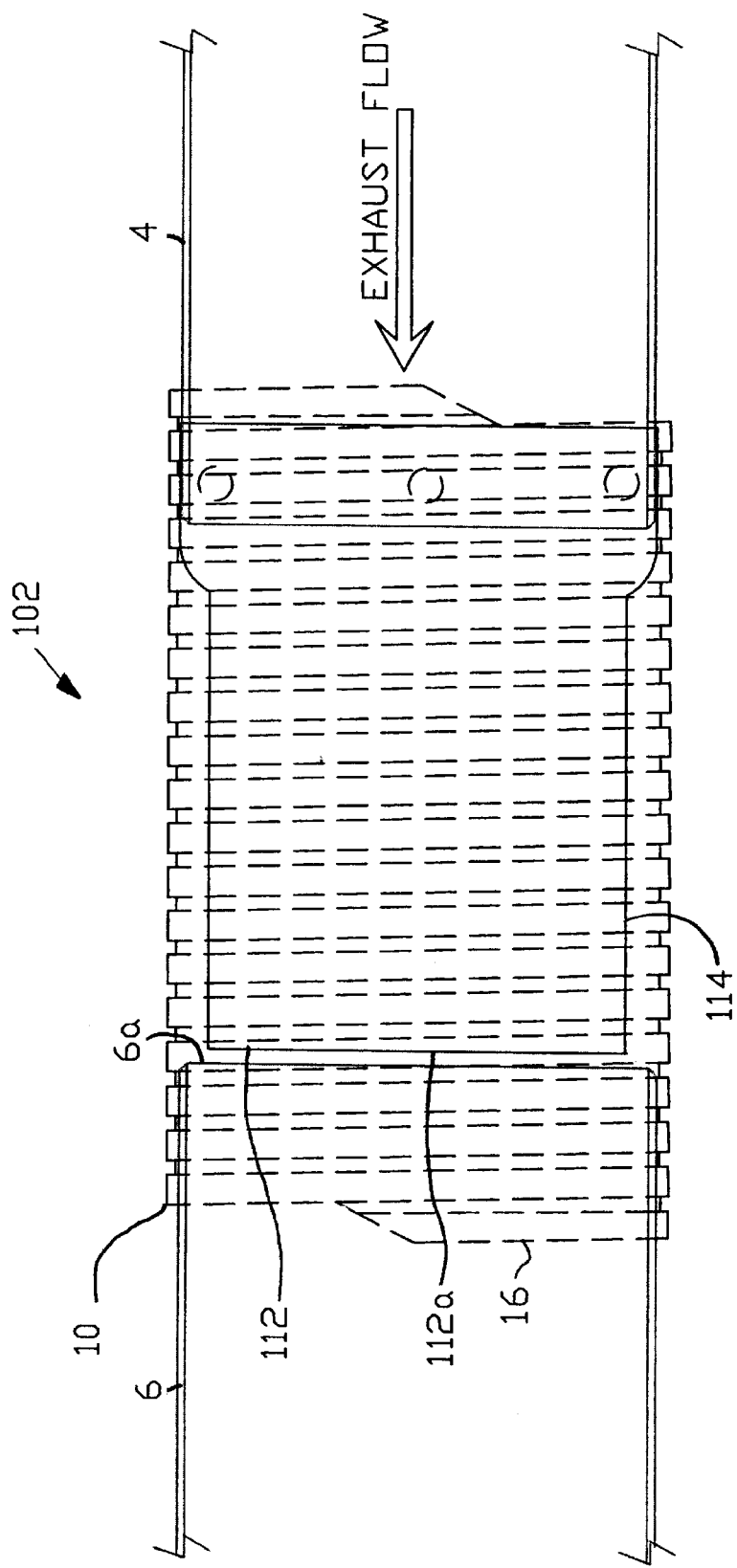
FIG. 2 is a side elevational view of a first modified embodiment thereof.

Referring to FIG. 2, the reference numeral 102 generally designates a connector assembly comprising a first modified embodiment of the present invention. As shown, the connector assembly 102 includes a modified liner tube 112 with a second end 112a which terminates in spaced relation upstream from the hose second end 16. Moreover, clearance 114 is provided between the liner tube second end 122a and the second exhaust pipe end 6a.

The connector assembly 102 operates in a substantially similar manner to the flexible connector assembly 2 described above.

V. Connector Assembly 202

Figure 3:
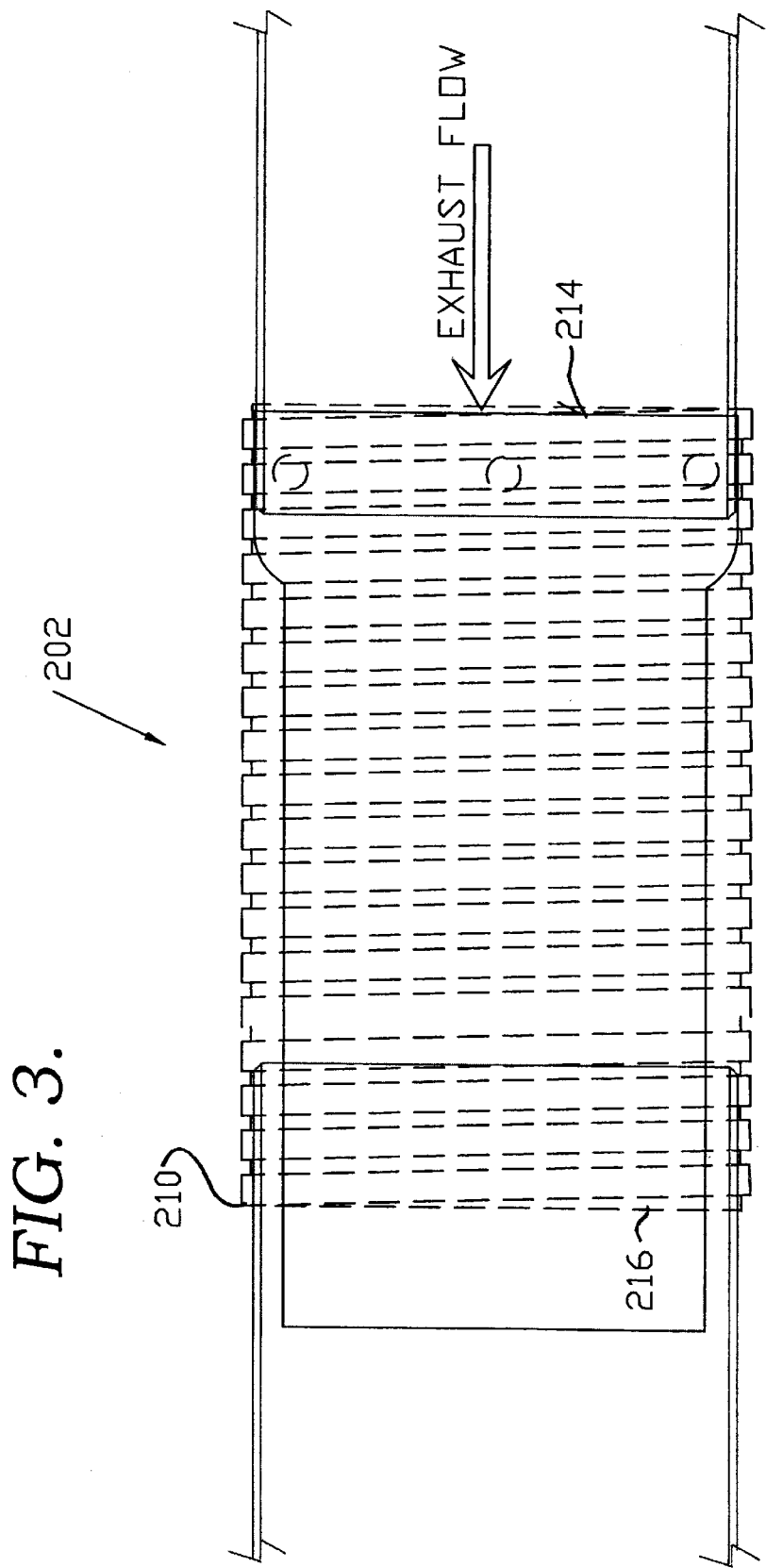
FIG. 3 is a side elevational view of a second modified embodiment thereof.

Referring to FIG. 3, the reference numeral 202 generally designates a flexible connector assembly embodying the present invention and including a modified flexible metal hose 210. The flexible metal hose section 210 includes square-cut first and second ends 214, 216. Otherwise the connector assembly 202 is substantially similar to the connector assembly 2 described above.

VI. Third Alternative Embodiment Connector Assembly 302

A flexible connector assembly 302 comprising a third modified embodiment of the present invention is shown in FIG. 4 and is generally designated by the reference numeral 302. The connector assembly 302 includes a flexible metal hose section 310 which is substantially similar to the flexible metal hose section 210 described above, and includes square-cut first and second ends 314, 316.

The connector assembly 302 also includes a liner tube 312 with a second end 312a terminating in spaced relation from a second exhaust pipe end 6a whereby an annular clearance 314 is formed there between.

The connector assembly 302 otherwise operates in a substantially similar manner to the connector assemblies 2, 102, and 202 described above.

VII. Operation and Installation

The connector assemblies 2, 102, 202, and 302 are designed for relatively easy installation with standard tools and equipment, such as a pair of band clamps, 28, 30 or weldments.

The configuration of the liner tube with a first, enlarged-diameter section 20 and a second, reduced-diameter section 22 minimizes stress and metal fatigue associated with vibration and relative movement within the exhaust system 8 and its components, such as the exhaust pipes 4, 6. Thus, relative vibration and movement between the exhaust pipes 4, 6 is accommodated by the flexible metal hose section 10. The spot weld 26 mounting of the liner tube 12 within the hose 10 provides a secure connection there between, whereby the first band clamp 28 securely retains the first exhaust pipe 4 within the liner tube first section 20. Exhaust gas leakage is thus minimized. The clearance 32 between the liner tube second section 22 and the hose bore 18 facilitates movement therebetween. For example, considerable bending can occur in the flexible metal hose 10 due to the annular clearance 32, which permits bending of the flexible metal hose 10 without interference from the liner tube 12.

It is to be understood that, although certain embodiments of the invention have been described herein, the invention is not to be limited thereto.

Claims:

1. A flexible connector assembly for an exhaust system, including first and second exhaust pipes with first and second exhaust pipe ends positioned in spaced relation from each other, which assembly includes:

(a) a flexible metal hose section with first and second ends and a bore extending between and open at said ends;

(b) a liner tube including a first, enlarged-diameter end telescopically receiving said first exhaust pipe end, said liner tube further including a second, reduced-diameter end and a body with the same diameter as the second liner tube end, said liner tube body extending from said liner tube first end to said liner tube second end and positioned generally within the flexible metal hose section;

(c) a plurality of circumferentially-spaced spot welds connecting said hose section in proximity to its first end with said liner tube in proximity to its first end;

(d) first and second clamps respectively clamping said hose section first end onto said liner first end and clamping said hose section second end onto said second exhaust pipe end;

(e) an annular clearance formed within said flexible metal hose section and around said liner body;

(f) said first and second exhaust pipe ends being connected solely by said flexible metal hose section;

(g) said hose section second end extending downstream beyond said liner second end; and (h) said liner second end being positioned in spaced relation upstream from said second exhaust pipe end.

\* \* \* \* \*